United States Patent
Lin et al.

(10) Patent No.: US 8,432,630 B1
(45) Date of Patent: Apr. 30, 2013

(54) DISK DRIVE COMPONENT TEST SYSTEM

(75) Inventors: Tao Lin, San Jose, CA (US); Gang Lin, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 372 days.

(21) Appl. No.: 12/828,086

(22) Filed: Jun. 30, 2010

(51) Int. Cl.
*G11B 27/36* (2006.01)
*G01R 33/12* (2006.01)

(52) U.S. Cl.
USPC ................................ 360/31; 324/212

(58) Field of Classification Search ............... None
See application file for complete search history.

(56) References Cited

U.S. PATENT DOCUMENTS

| | | | |
|---|---|---|---|
| 4,346,416 A | 8/1982 | Riggle et al. |
| 4,845,579 A | 7/1989 | Wilkinson, Jr. |
| 4,862,584 A | 9/1989 | Budy et al. |
| 4,902,971 A | 2/1990 | Guzik et al. |
| 5,029,026 A | 7/1991 | Stefansky et al. |
| 5,109,310 A | 4/1992 | Ohkjita et al. |
| 5,299,944 A | 4/1994 | Larabell et al. |
| 5,404,636 A | 4/1995 | Stefansky et al. |
| 5,666,243 A | 9/1997 | Brent |
| 5,741,055 A | 4/1998 | Chen |
| 5,757,587 A | 5/1998 | Berg et al. |
| 5,786,677 A | 7/1998 | Marr |
| 5,801,531 A | 9/1998 | Viches et al. |
| 5,801,901 A | 9/1998 | Bryan et al. |
| 5,805,377 A | 9/1998 | Lerdal et al. |
| 5,825,180 A | 10/1998 | Guzik |
| 5,905,606 A | 5/1999 | Johnson et al. |
| 6,099,362 A | 8/2000 | Viches et al. |
| 6,140,661 A | 10/2000 | Nodelman |
| 6,140,815 A | 10/2000 | Greene et al. |
| 6,150,813 A | 11/2000 | Schadewald, Jr. et al. |
| 6,169,413 B1 | 1/2001 | Paek et al. |
| 6,222,291 B1 | 4/2001 | Boutaghou |
| 6,226,157 B1 | 5/2001 | Kim |
| 6,227,516 B1 | 5/2001 | Webster, Jr. et al. |
| 6,229,303 B1 | 5/2001 | Guzik |
| 6,236,201 B1 | 5/2001 | Kilicci et al. |
| 6,242,910 B1 | 6/2001 | Guzik et al. |
| 6,252,738 B1 | 6/2001 | Slezak |
| 6,346,809 B1 | 2/2002 | Karam, II |
| 6,414,807 B2 | 7/2002 | Bates et al. |
| 6,421,236 B1 | 7/2002 | Montoya et al. |
| 6,434,499 B1 | 8/2002 | Ulrich et al. |
| 6,466,400 B1 | 10/2002 | Iwahara et al. |
| 6,472,866 B2 | 10/2002 | Aslami |
| 6,510,752 B1 | 1/2003 | Sacks et al. |
| 6,526,841 B1 | 3/2003 | Wanek et al. |
| 6,531,867 B1 | 3/2003 | Greene et al. |
| 6,566,870 B2 | 5/2003 | Sorenson et al. |
| 6,571,454 B1 | 6/2003 | Haney et al. |
| 6,679,128 B2 | 1/2004 | Wanek et al. |

(Continued)

*Primary Examiner* — Regina N Holder

(57) ABSTRACT

A hard drive component test system is provided. The hard drive component test system includes a rack having multiple test bays with first test sub-assemblies mounted in respective ones of the of test bays. A test control system is electrically coupled to each of the first test sub-assemblies. Each of the test bays is configured to receive a second test sub-assembly and to engage the second test sub-assembly with the first test sub-assembly mounted in the respective bay to form a drive assembly. The test control system is configured to selectively execute a test process on the drive assemblies mounted in the rack.

20 Claims, 6 Drawing Sheets

U.S. PATENT DOCUMENTS

| | | |
|---|---|---|
| 6,696,831 B2 | 2/2004 | Nozu |
| 6,781,796 B2 | 8/2004 | Macpherson et al. |
| 6,798,650 B2 | 9/2004 | Reznikov et al. |
| 6,806,700 B2 | 10/2004 | Wanek et al. |
| 6,853,185 B2 | 2/2005 | Tsukamoto et al. |
| 6,930,850 B2 | 8/2005 | Takagi et al. |
| 6,943,971 B2 | 9/2005 | Kainuma et al. |
| 7,054,150 B2 | 5/2006 | Orriss et al. |
| 7,061,235 B2 | 6/2006 | Guzik et al. |
| 7,076,391 B1 | 7/2006 | Pakzad et al. |
| 7,088,541 B2 | 8/2006 | Orriss et al. |
| 7,131,346 B1 | 11/2006 | Buttar et al. |
| 7,203,060 B2 | 4/2007 | Kay et al. |
| 7,248,039 B2 | 7/2007 | Green et al. |
| 7,288,935 B2 | 10/2007 | Farren et al. |
| 7,295,002 B2 | 11/2007 | Guzik et al. |
| 7,342,780 B2 | 3/2008 | Scicluna et al. |
| 7,352,536 B2 | 4/2008 | Kim |
| 7,355,393 B2 | 4/2008 | Tokutomi et al. |
| 7,376,537 B2 | 5/2008 | Delory, Jr. |
| 7,518,814 B2 | 4/2009 | Umezaki et al. |
| 7,529,062 B2 | 5/2009 | Xu |
| 7,532,006 B2 | 5/2009 | Guzik et al. |
| 7,646,596 B2 | 1/2010 | Ng |
| 7,705,588 B2 | 4/2010 | Eaton et al. |
| 7,836,603 B2 | 11/2010 | Guzik et al. |
| 7,840,664 B2 | 11/2010 | Dugatkin et al. |
| 7,880,463 B2 | 2/2011 | Guzik et al. |
| 8,027,801 B2 | 9/2011 | Nishiuchi et al. |
| 8,218,256 B1 | 7/2012 | Lin et al. |
| 8,270,118 B1 | 9/2012 | Cheng et al. |
| 2003/0218827 A1 | 11/2003 | Teo et al. |
| 2005/0018397 A1 | 1/2005 | Kay et al. |
| 2005/0219809 A1 | 10/2005 | Muncaster et al. |
| 2006/0085158 A1 | 4/2006 | Cakiner |
| 2006/0152856 A1 | 7/2006 | Zhao et al. |
| 2007/0034368 A1 | 2/2007 | Atkins et al. |
| 2007/0046286 A1 | 3/2007 | Umezaki et al. |
| 2007/0136021 A1 | 6/2007 | Anderson et al. |
| 2007/0143054 A1 | 6/2007 | Anderson et al. |
| 2007/0143056 A1 | 6/2007 | Anderson et al. |
| 2007/0143057 A1 | 6/2007 | Anderson et al. |
| 2007/0205763 A1 | 9/2007 | Yamasaki |
| 2008/0007865 A1 | 1/2008 | Orriss et al. |
| 2008/0060445 A1 | 3/2008 | Obergfell et al. |
| 2008/0062855 A1 | 3/2008 | Warn et al. |
| 2008/0225701 A1 | 9/2008 | Pimlott |
| 2008/0247091 A1 | 10/2008 | Guzik et al. |
| 2009/0009954 A1 | 1/2009 | Bushby et al. |
| 2009/0153992 A1* | 6/2009 | Garcia et al. .................. 360/31 |
| 2011/0149424 A1* | 6/2011 | Dalphy et al. .................. 360/31 |

* cited by examiner

DISK DRIVE COMPONENT TEST SYSTEM

BACKGROUND

Component testing plays an important role during the manufacture and assembly of hard disk drives. Testing individual components allows the manufacturer to determine whether specifications of a new design have been met prior to incorporating the new component into a fully assembled hard disk drive. Testing representative component samples provides a measure of quality control that may prevent the wasteful assembly of a large number of hard disk drives using a faulty batch of components.

Conventional testing systems typically are expensive and relatively complex. Conventional testing systems may cost several hundreds of thousands, and possibly millions, of dollars to purchase and maintain. Furthermore, many of these systems can test only one component at a time. The expense and capacity of conventional testing systems limits the number of testing systems a manufacturer can purchase given a limited budget and the number of components that can be tested within a given time frame.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

Figure 1:
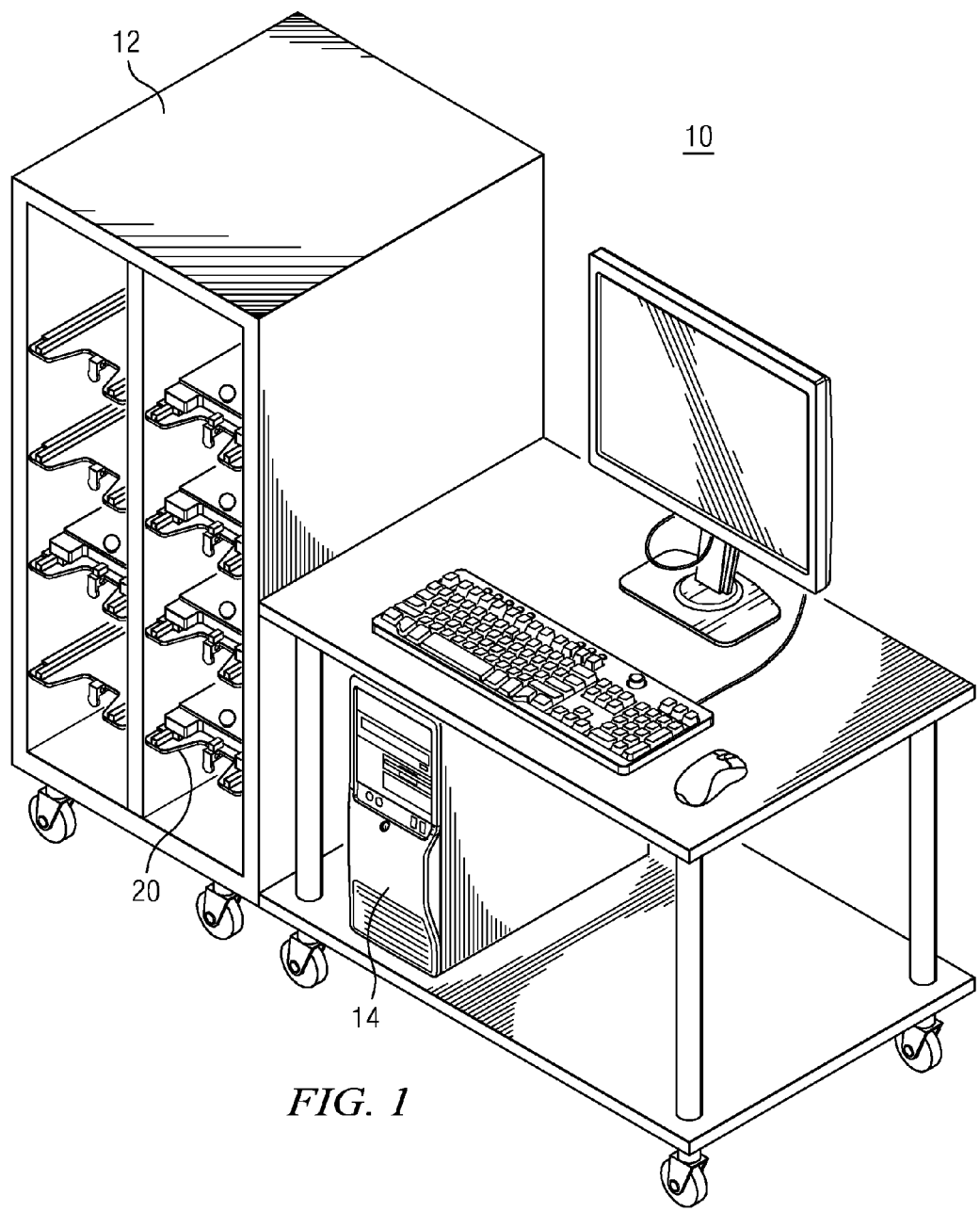
FIG. 1 is a diagram illustrating components of a disk drive component test system according to one aspect of the subject technology.

FIG. 1 is a diagram illustrating components of a disk drive component test system 10 according to one aspect of the subject technology. Test system 10 includes rack 12 containing multiple test bays, each containing a test assembly 20. Test system 10 further includes test control system 14, which is coupled to each test assembly 20 mounted in the test bays of rack 12. Test system 10 provides a modular testing platform for simultaneously testing multiple disk drive components in test assemblies 20 in a time and space efficient manner, as will be described in more detail below.

In the example shown in FIG. 1, rack 12 includes two columns of four vertically aligned test bays for a total of eight test bays. The subject technology is not limited to this arrangement of test bays. For example, rack 12 may include only a single column of vertically aligned test bays or more than two columns of vertically aligned test bays. In addition, the number of test bays in each column within rack 12 may be greater than four or less than four.

Figure 2A:
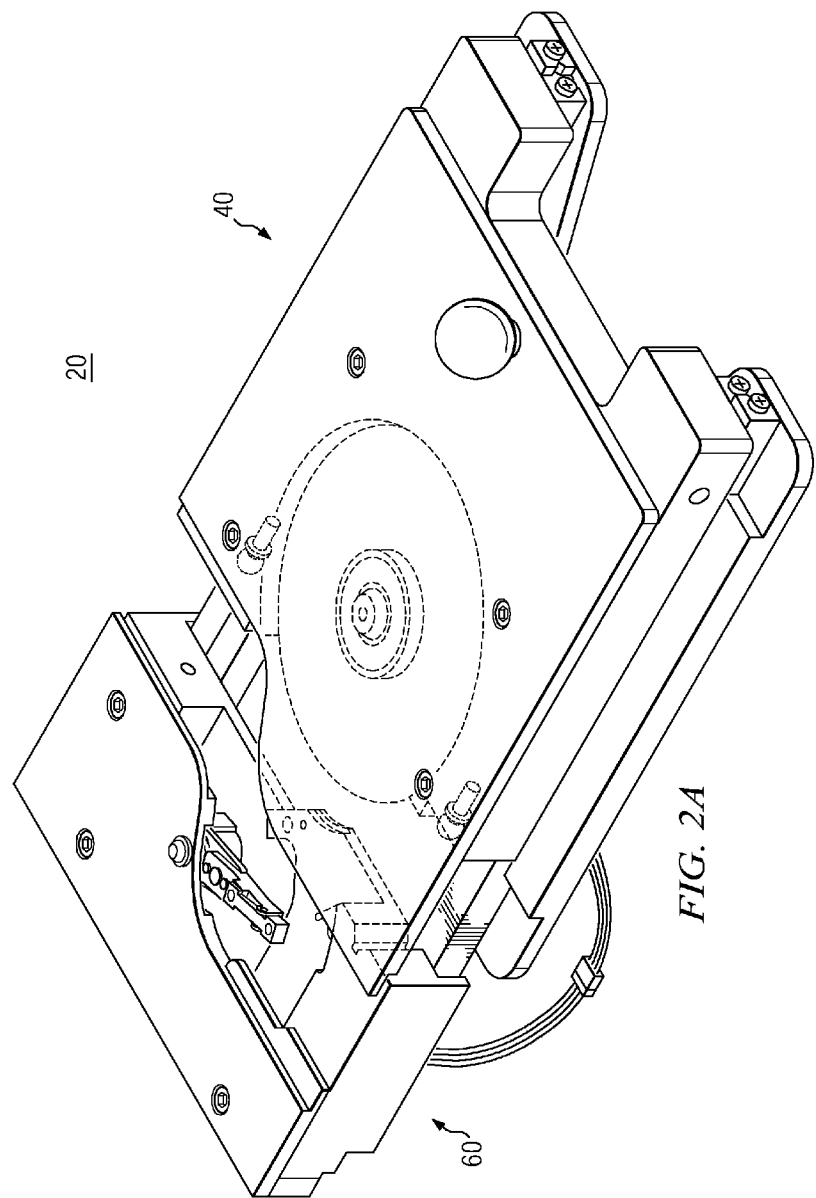
FIGS. 2A and 2B are diagrams illustrating a partially uncoupled test assembly and a coupled test assembly, respectively, according to one aspect of the subject technology.
Figure 2B:
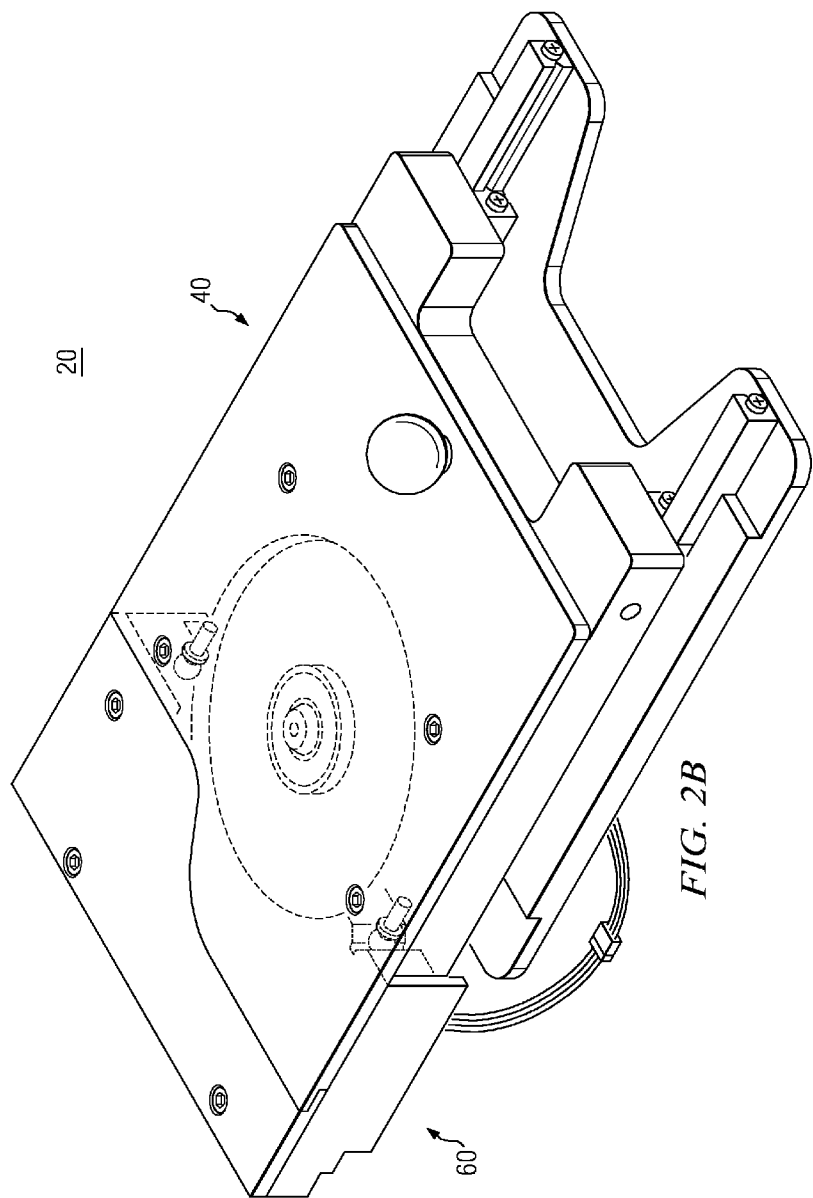

As noted above, each of the test bays in rack 12 is configured to have a test assembly 20 mounted therein. Each test assembly 20 includes two test sub-assemblies that are configured to be un-coupled from one another, as shown in FIG. 2A, and coupled together, as shown in FIG. 2B, for purposes of exchanging and testing drive components in test system 10. According to one aspect of the subject technology, a first test sub-assembly is a disk spindle assembly cartridge containing a magnetic disk mounted to a spindle motor configured to rotate the magnetic disk at high speed. According to one aspect of the subject technology, a second test sub-assembly is a head stack assembly cartridge containing a head stack assembly configured to read and write data to the magnetic disk in the disk spindle assembly cartridge 40 when the two test sub-assemblies are coupled together. Each of these test sub-assemblies is described in more detail below.

Figure 3:
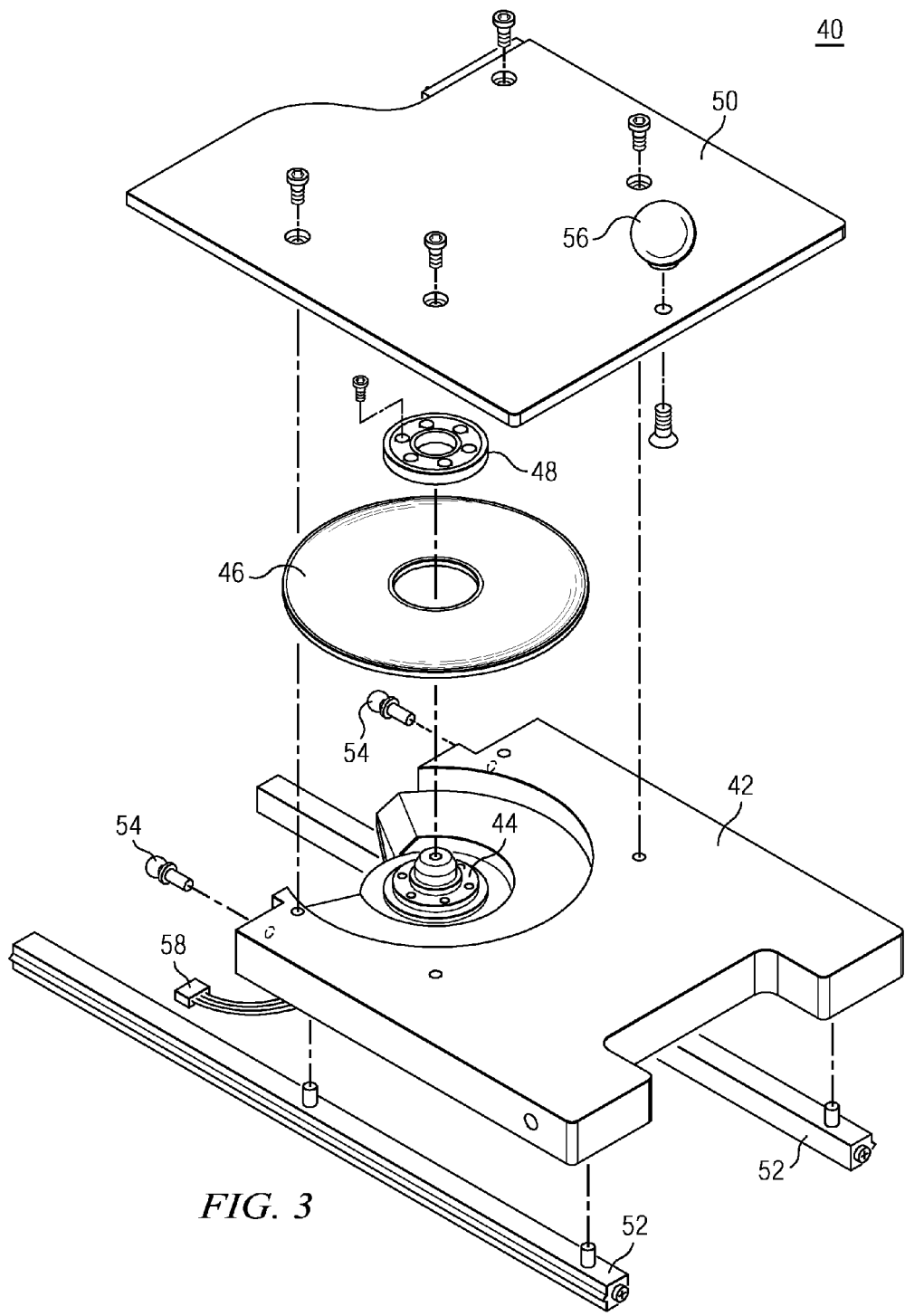
FIG. 3 is an exploded view of a disk spindle assembly cartridge according to one aspect of the subject technology.

FIG. 3 is an exploded view of disk spindle assembly cartridge 40 according to one aspect of the subject technology. Disk spindle assembly cartridge 40 includes base 42, spindle motor 44, magnetic disk 46, disk clamp 48, and cover plate 50. Spindle motor 44 is attached to an inner surface of base 42. Spindle motor 44 may be similar or identical to spindle motors used in production hard drives. Spindle motor 44 may be attached to the inner surface of base 42 using screws or other fastening mechanisms known to those skilled in the art.

Magnetic disk 46 is seated on spindle motor 44 and secured to spindle motor 44 by disk clamp 48. Disk clamp 48 may be attached to spindle motor 44 using screws or other fastening mechanisms through a central opening in magnetic disk 46. As the screws or other fastening mechanisms are tightened, the perimeter of disk clamp 48 applies pressure on the upper surface of magnetic disk 46 thereby preventing slippage between magnetic disk 46 and a spindle of spindle motor 44. As with spindle motor 44, magnetic disk 46 and disk clamp 48 may be similar or identical to magnetic disks and disk clamps used in production hard drives.

Cover plate 50 is attached to base 42, which together partially enclose magnetic disk 46. Cover plate 50 may be attached to base 42 using screws or other fastening mechanisms that allow cover plate 50 to be removable from base 42. An opening is defined along one side of disk spindle assembly cartridge 40 that provides access to magnetic disk 46 by a head stack assembly when disk spindle assembly cartridge 40 is coupled to head stack assembly cartridge 60. Base 42 and cover plate 50 may be made of a metal or metal alloy for durability and strength. For example, base 42 and/or cover plate 50 may be made from aluminum or an aluminum alloy. Alternatively, a more durable material such as stainless steel may be used for base 42 and/or cover plate 50.

Figure 4:
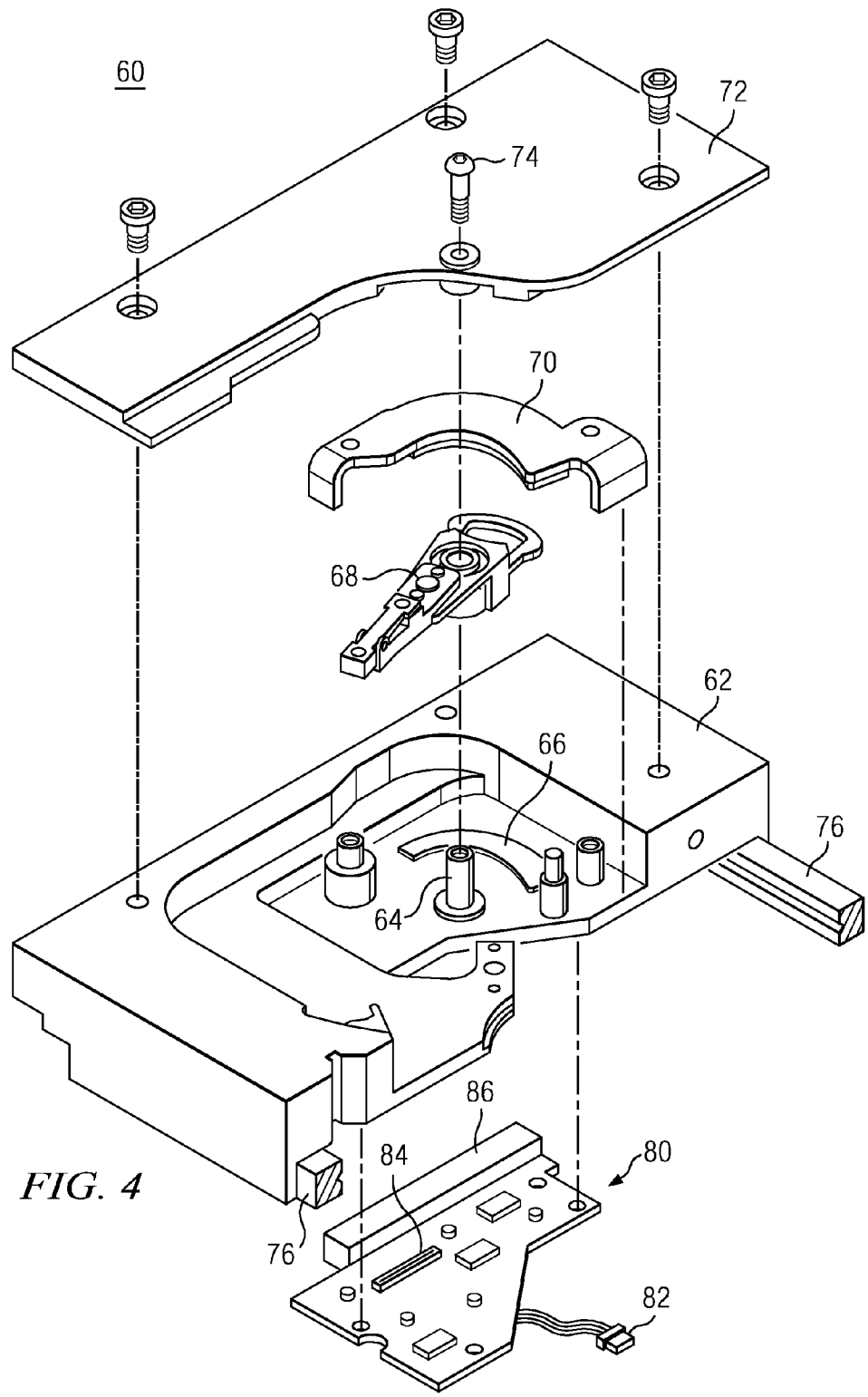
FIG. 4 is an exploded view of a head stack assembly cartridge according to one aspect of the subject technology.

FIG. 4 is an exploded view of head stack assembly cartridge 60 according to one aspect of the subject technology. Head stack assembly cartridge 60 includes base plate 62, pivot shaft 64, base magnet 66, and head stack assembly 68. As shown in FIG. 4, pivot shaft 64 and base magnet 66 are arranged on an inner surface of base plate 62. Pivot shaft 64 is arranged on the inner surface of base plate 62 to pivotally mount head stack assembly 68. Specifically, pivot shaft 64 is arranged to engage a pivot assembly of head stack assembly 68, which allows an actuator coil assembly of head stack assembly 68 to pivot about pivot shaft 64. Base magnet 66 is positioned on the inner surface of base plate 62 to be adjacent to a coil of head stack assembly 68 when mounted to form part of a voice coil motor for controlling the movement of the actuator coil assembly about pivot shaft 64.

Head stack assembly 68 may be similar or identical to head stack assemblies used in production hard drives, thereby allowing production head stack assemblies to be mounted in head stack assembly cartridge 60 for testing. Alternatively, head stack assembly 68 may be modified to allow head gimbal assemblies to be easily mounted and dismounted for testing. For example, the actuator coil assembly may be modified to include the mounting mechanism described in U.S. patent application Ser. No. 12/500,546 filed on Jul. 9, 2009, and entitled "Head Gimbal Assembly Mounting Mechanism" and the clamping mechanism described in U.S. patent application Ser. No. 12/494,869 filed on Jun. 30, 2009, and entitled "Dual-State Clamping Mechanism," both of which are hereby incorporated by reference herein.

As shown in FIG. 4, head stack assembly cartridge 60 further includes cover magnet 70 and cover plate 72. Cover plate 72 is attached to base plate 62 using screws or other fastening mechanisms that allow cover plate 72 to be removable from base plate 62. Head stack assembly 68 is attached to pivot shaft 64 and stabilized against cover plate 72 using pivot screw 74. In one configuration, cover magnet 70 is attached to the inner surface of cover plate 72 and arranged to be adjacent to the coil of head stack assembly 68 mounted on pivot shaft 64 and opposite base magnet 66. Base magnet 66, cover magnet 70, and the coil of head stack assembly 68 form the voice coil motor for controlling the movement of the actuator coil assembly about pivot shaft 64.

FIG. 4 depicts head stack assembly 68 being attached to pivot shaft 64 and stabilized against cover plate 72 using pivot screw 74 extending through cover plate 72. The subject technology is not limited to this arrangement for mounting and securing head stack assembly 68 in head stack assembly cartridge 60. For example, a clamping mechanism such as the one described in U.S. application Ser. No. 12/610,220 filed on Oct. 30, 2009, and entitled "Head Stack Assembly Cartridge," which is hereby incorporated by reference herein, may be used to secure head stack assembly 68 and facilitate a relatively quick and easy replacement of head stack assembly 68 for testing multiple head stack assemblies.

Base plate 62 and cover plate 72 may be made of a metal or metal alloy for durability and strength. For example, aluminum or an aluminum alloy may be used for base plate 62 and/or cover plate 72. Alternatively, a more durable material such as stainless steel may be used for base plate 62 and/or cover plate 72.

As further shown in FIG. 4, printed circuit board assembly 80 may be attached to base plate 62 of head stack assembly cartridge 60. Printed circuit board assembly 80 includes firmware and control circuitry used to operate disk spindle assembly cartridge 40 and head stack assembly cartridge 60 as well as to interface with test control system 14 to run tests on hard drive components in either or both of the test sub-assemblies and communicate test results for storage and/or analysis in test control system 14. Printed circuit board assembly 80 includes first interface 82 configured to make electrical contact and communicate electrical signals with connector 58 (shown in FIG. 3) of spindle motor 44 in disk spindle assembly cartridge 40. Printed circuit board assembly 80 also includes second interface 84 configured to make electrical contact and communicate electrical signals with head stack assembly 68 mounted in head stack assembly cartridge 60 via a flex cable assembly (not shown). Printed circuit board assembly 80 further includes third interface 86 configured to make electrical contact and communicate electrical signals with test control system 14.

Printed circuit board assembly 80 may be similar or identical to printed circuit board assemblies used in production hard drives using similar or identical interfaces for communicating with connected components. Using production printed circuit board assemblies reduces costs involved in implementing test system 10 by not requiring a dedicated design for test system 10 and allows for standard interface connections and protocols to be used for communication between test system 10 and an external test control system. Furthermore, production flex cable assemblies of head stack assemblies and spindle motors may be connected to printed circuit board assembly 80 and controlled with little or no modification to how these components are connected and controlled in production hard drives.

As depicted in FIGS. 2A and 2B, disk spindle assembly cartridge 40 and head stack assembly cartridge 60 may be coupled and un-coupled. When coupled together, disk spindle assembly cartridge 40 and head stack assembly cartridge 60 may form an internal environment similar to that of a production hard drive containing, for example, magnetic disk 46 and head stack assembly 68. The interior dimensions of disk spindle assembly cartridge 40 and head stack assembly cartridge 60 may be similar to those of a production hard drive. This similarity both allows components from production hard drives to be used in these modules as well as creates similar environmental conditions under which component testing can be performed.

To align disk spindle assembly cartridge 40 with head stack assembly cartridge 60, a pair of alignment rails 52 may be attached to base 42 of disk spindle assembly cartridge 40, as depicted in FIG. 3, and configured to mate with a corresponding pair of alignment rails 76 attached to base plate 62 of head stack assembly cartridge 60, as depicted in FIG. 4. Disk spindle assembly cartridge 40 may further include a pair of tooling balls 54 arranged to abut different structural areas on head stack assembly cartridge 60 to further align the two test sub-assemblies. In configurations where head stack assembly cartridge 60 is mounted in rack 12 of test system 10 and disk spindle assembly cartridge 40 is arranged to be removably coupled to head stack assembly cartridge 60 in rack 12, knob 56 may be attached to cover plate 50 of disk spindle assembly cartridge 40 to provide a handle for an operator to slide disk spindle assembly cartridge 40 in and out of rack 12 from a front-loading position. To secure disk spindle assembly cartridge 40 in the coupled position when mounted in rack 12, a clamp may be positioned in the test bay to hold disk spindle assembly cartridge 40 against head stack assembly cartridge 60 in a coupled configuration. The subject technology is not limited to this structural configuration for aligning and coupling disk spindle assembly cartridge 40 and head stack assembly cartridge 60. Other structural configurations may be used to align and couple disk spindle assembly cartridge 40 and head stack assembly cartridge 60.

As described above, test system 10 is a modular hard drive component test system that allows simultaneous testing of multiple disk drive components using multiple test assemblies 20 mounted in respective test bays of rack 12. According to one aspect of the subject technology, one head stack assembly cartridge 60 is mounted in each test bay of rack 12 using fasteners, brackets, mounts, etc. known to those skilled in the art. Printed circuit board assembly 80 attached to each mounted head stack assembly cartridge 60 is electrically coupled to test control system 14 via third interface 86.

Test control system 14 represents any general purpose computer, server, workstation, etc. used to execute test processes to test and evaluate hard drive components. Test control system 14 includes one or more processors and computer/ machine readable media containing code that is executable by the processor(s) to perform the test processes. The computer/machine readable media may be volatile or non-volatile memory. The media may be electrical, such as RAM, DRAM, Flash, etc., optical, such as DVD, CD-ROM, etc., or magnetic. In addition to containing executable code, the computer/machine readable media may be used to store test data captured while executing test processes on test assemblies 20 mounted in rack 12. As depicted in FIG. 1, test control system 14 also may include a monitor, a keyboard, a pointing device (i.e., mouse), etc. comprising a user interface which may be used to display captured test data to an operator, to display test status information, to allow the operator to select test processes and/or particular test assemblies 20 within rack 12 for which to execute the selected test processes, etc.

As noted above, test control system 14 is electrically coupled to printed circuit board assembly 80 in each test bay in rack 12. Test control system 14 and the printed circuit board assemblies 80 may be configured to communicate using any of a number of hard drive interface standards. For example, printed circuit board assemblies 80 may be configured to communicate using SATA, EIDE, SCSI, etc. These interface standards are well known in the art and will not be described further herein.

The head stack assembly cartridge 60 mounted in each test bay of rack 12 is configured to be detachably coupled to a disk spindle assembly cartridge 40 in the manner described above. Spindle motor 44 of a disk spindle assembly cartridge 40 may be electrically coupled to first interface 82 of the printed circuit board assembly 80 attached to the head stack assembly cartridge 60 via connector 58 when the disk spindle assembly cartridge 40 is detachably mounted in a test bay. Once the two test sub-assemblies (i.e., disk spindle assembly cartridge 40 and head stack assembly cartridge 60) are coupled to form test assembly 20, one or more drive components within test assembly 20 may be tested by test control system 14. After the testing is complete, disk spindle assembly cartridge 40 may be removed from the test bay and another disk spindle assembly cartridge 40 may be mounted and coupled to head stack assembly cartridge 60 mounted in the test bay. In this manner, test system 10 is designed to allow test sub-assemblies to be exchanged relatively quickly and easily, allowing different types of magnetic disks 46 or magnetic disks 46 encoded with different test data or patterns to be quickly and easily mounted for testing purposes.

With rack 12 providing multiple test bays for mounting test assemblies 20, and test control system 14 electrically coupled to each test assembly 20, an operator can select and execute test processes on multiple test assemblies 20. A test process run on each test assembly 20 may be executed and run independently of the test processes run on other test assemblies 20 in rack 12. Accordingly, test processes being executed for multiple test assemblies 20 in rack 12 may be run simultaneously in parallel, sequentially one by one, or one or more test processes may be run partially overlapping the execution of one or more other test processes. When a test process is being executed for one or more test assemblies 20 currently mounted in rack 12, an operator can mount additional test sub-assemblies in available test bays or swap out test sub-assemblies in test bays for which test processes have completed. This ability to mount and dismount test sub-assemblies while executing test processes on other mounted test assemblies, improves the efficiency and throughput of the testing process. Utilizing rack 12 having multiple test bays in a vertical configuration allowing test sub-assemblies to be mounted and dismounted from a front-loading position together with a single test control system 14 minimizes the footprint of test system 10 while increasing the overall testing throughput.

While the first test sub-assembly mounted in rack 12 has been described as a head stack assembly cartridge including a printed circuit board assembly and the second test sub-assembly detachably mounted and coupled to the first test sub-assembly has been described as a disk spindle assembly cartridge, the subject technology is not limited to this arrangement. The modular testing platform described herein provides an example of how the components of a hard drive can be separated into modules that are easily interchanged for testing purposes. Accordingly, the arrangement of the test sub-assemblies may vary with different configurations. For example, in an alternative configuration the first test sub-assembly mounted in each test bay may be a disk spindle assembly cartridge, while the second test sub-assembly that is detachably mounted in each test bay and coupled to the first test sub-assembly may be a head stack assembly cartridge. In this manner head stack assembly cartridges may be swapped in and out of test system 10 to facilitate testing of head stack assemblies and/or head gimbal assemblies mounted therein.

Figure 5:
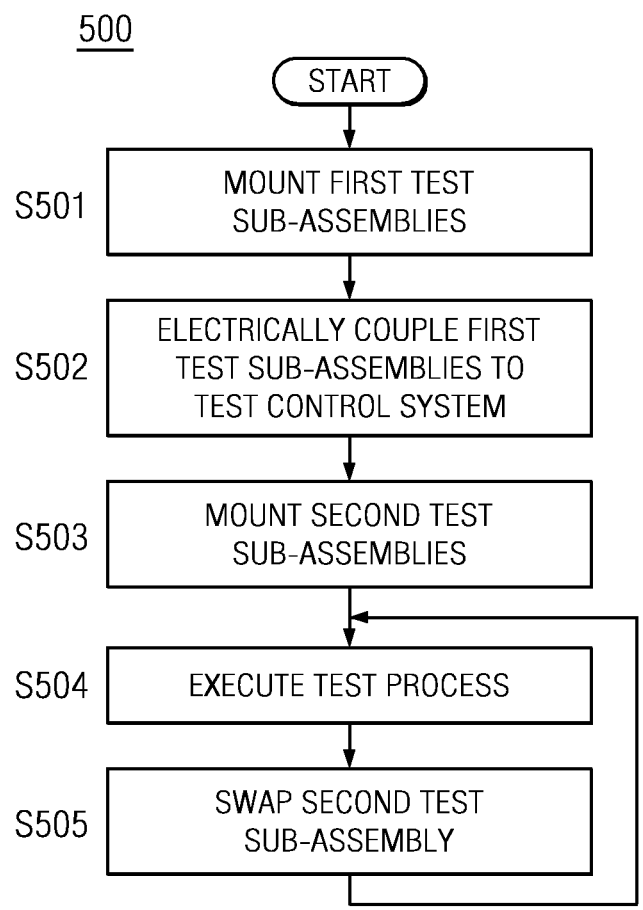
FIG. 5 is a flowchart illustrating a method for testing multiple hard drive components according to one aspect of the subject technology.

FIG. 5 is a flowchart illustrating a method for testing multiple hard drive components according to one aspect of the subject technology. The method begins in step S501 where multiple first test sub-assemblies, such as head stack assembly cartridges 60, are mounted in respective test bays of rack 12. In step S502, printed circuit board assemblies 80 attached to each head stack assembly 60 mounted in rack 12 are electrically coupled to test control system 14. In step S503, multiple second test sub-assemblies, such as disk spindle assembly cartridges 40, are mounted in respective test bays of rack 12 by coupling the second test sub-assemblies to the respective first test sub-assemblies to form test assemblies. In step S504, a test process is executed by test control system 14 on the test assemblies to test one or more hard drive components in each test assembly.

In steps S505, one or more second test sub-assemblies in rack 12 are swapped with new second test sub-assemblies. The process then returns to step S504 where a test process is executed by test control system 14 on the newly mounted second test sub-assemblies. Steps S504 and S505 are repeated until all second test sub-assemblies prepared for testing have been swapped in to rack 12 and had test processes executed by test control system 14.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A hard drive component test system comprising:
   a rack comprising a plurality of test bays;
   a plurality of first test sub-assemblies mounted in respective ones of the plurality of test bays; and
   a test control system electrically coupled to each of the plurality of first test sub-assemblies,
   wherein each of the plurality of test bays is configured to receive a second test sub-assembly and to engage the second test sub-assembly with the first test sub-assembly mounted in the respective bay to form a test assembly, and
   wherein the test control system is configured to selectively execute a test process on the up to a plurality of test assemblies mounted in the rack.

2. The hard drive component test system according to claim 1, wherein a plurality of the test bays are vertically aligned in the rack.

3. The hard drive component test system according to claim 1, wherein the test control system is configured to execute the test process on the up to a plurality of test assemblies in parallel.

4. The hard drive component test system according to claim 1, wherein the test control system is configured to execute the test process on the up to a plurality of test assemblies sequentially.

5. The hard drive component test system according to claim 1, wherein each of the plurality of first test sub-assemblies comprises a head stack assembly, and
   wherein each of the up to a plurality of second test sub-assemblies comprises a disk spindle assembly.

6. The hard drive component test system according to claim 1, wherein each of the plurality of first test sub-assemblies comprises a disk spindle assembly, and
   wherein each of the up to a plurality of second test sub-assemblies comprises a head stack assembly.

7. The hard drive component test system according to claim 1, wherein each of the plurality of first test sub-assemblies comprises a pair of first rails, and
   wherein each of the up to a plurality of second test sub-assemblies comprises a pair of second rails configured to align with the pair of first rails on a respective one of the plurality of first test sub-assemblies.

8. The hard drive component test system according to claim 7, wherein each of the plurality of first test sub-assemblies is configured to slidably receive one of the up to a plurality of second test sub-assemblies and to align the second test sub-assembly with the respective first test sub-assembly.

9. The hard drive component test system according to claim 1, wherein each of the plurality of test bays is configured to receive the second test sub-assembly from a front-loading position.

10. The hard drive component test system according to claim 1, wherein the test control system is electrically coupled to the printed circuit board assembly of each of the plurality of first test sub-assemblies via a hard drive interface.

11. The hard drive component test system according to claim 1, wherein the plurality of first test sub-assemblies are removably mounted in the respective ones of the plurality of test bays.

12. The hard drive component test system according to claim 1, wherein the test control system is configured to capture and store test data in a storage medium during execution of the test process.

13. The hard drive component test system according to claim 1, wherein the test control system comprises a display, and
   wherein the test control system is configured to display the captured test data on the display.

14. A method for testing multiple hard drive components, comprising:
   mounting a plurality of first test sub-assemblies in respective ones of a plurality of test bays in a rack;
   electrically coupling a test control system to each of the plurality of first test sub-assemblies;
   mounting a plurality of second test sub-assemblies in respective ones of the plurality of test bays, wherein the plurality of second test sub-assemblies engage the respective first test sub-assemblies in the respective ones of the plurality of test bays to form a plurality of test assemblies; and
   executing a test process using a test control system on the plurality of test assemblies to test a hard drive component in each of the plurality of test assemblies.

15. The method according to claim 14, wherein executing the test process on the plurality test assemblies comprises executing the test process on the plurality of test assemblies in parallel.

16. The method according to claim 14, wherein executing the test process on the plurality of test assemblies comprises executing the test process on the plurality of test assemblies sequentially.

17. The method according to claim 14, further comprising:
   swapping one of the plurality of second test sub-assemblies mounted in one of the plurality of test bays with another second test sub-assembly to form a second test assembly; and
   executing the test process on the second test assembly.

18. The method according to claim 14, wherein electrically coupling the test control system to each of the plurality of first test sub-assemblies comprises coupling the test control system to each of the plurality of first test sub-assemblies using a hard drive interface.

19. The method according to claim 14, further comprising displaying results of the test process.

20. The method according to claim 14, further comprising storing results of the test process.

* * * * *